United States Patent
Johnson et al.

(10) Patent No.: US 12,033,359 B2
(45) Date of Patent: Jul. 9, 2024

(54) METHOD AND DEVICE FOR GENERATING A RESULTANT IMAGE BASED ON COLORS EXTRACTED FROM AN INPUT IMAGE

(71) Applicant: Apple Inc., Cupertino, CA (US)

(72) Inventors: Garrett M. Johnson, San Francisco, CA (US); Pedro Mari, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 172 days.

(21) Appl. No.: 17/607,524

(22) PCT Filed: Mar. 25, 2020

(86) PCT No.: PCT/US2020/024644
§ 371 (c)(1),
(2) Date: Oct. 29, 2021

(87) PCT Pub. No.: WO2020/242569
PCT Pub. Date: Dec. 3, 2020

(65) Prior Publication Data
US 2022/0230359 A1    Jul. 21, 2022

Related U.S. Application Data

(60) Provisional application No. 62/855,754, filed on May 31, 2019.

(51) Int. Cl.
*G06T 7/90* (2017.01)
*H04N 1/60* (2006.01)

(52) U.S. Cl.
CPC ............ *G06T 7/90* (2017.01); *H04N 1/6027* (2013.01); *H04N 1/6075* (2013.01); *G06T 2207/10024* (2013.01)

(58) Field of Classification Search
CPC ........ G06T 2207/10024; H04N 1/6075; H04N 1/6027
See application file for complete search history.

(56) References Cited

U.S. PATENT DOCUMENTS 10,872,400 B1 * 12/2020 Persiantsev ............. G06T 5/002
2005/0219581 A1 * 10/2005 Dobashi ................. G06V 10/44
358/1.9

(Continued)

OTHER PUBLICATIONS

PCT International Search Report and Written Opinion dated May 28, 2020, PCT International Application No. PCT/US2020/024644, pp. 1-9.

(Continued)

*Primary Examiner* — Pinalben Patel
(74) *Attorney, Agent, or Firm* — Fernando & Partners, LLP

(57) ABSTRACT

In some implementations, a method includes: obtaining a first image; determining characterization properties for each of a plurality of pixels within the first image; determining a dominant hue based on the one or more characterization properties for each of the plurality of pixels within the first image; determining a plurality of hues that satisfy a predetermined perception threshold relative to the dominant hue based on the characterization properties for each of the plurality of pixels within the first image, wherein the plurality of hues is different from the dominant hue; and generating a second image based at least in part on the dominant hue and the plurality of hues. In some implementations, the second image corresponds to a color gradient generated based on the dominant hue within the first image. In some implementations, the second image is set as a wallpaper for a user interface.

25 Claims, 14 Drawing Sheets

(56) References Cited

U.S. PATENT DOCUMENTS

| | | | | |
|---|---|---|---|---|
| 2012/0114230 A1* | 5/2012 | Dai | ...................... | G06V 30/148 |
| | | | | 382/164 |
| 2014/0099026 A1* | 4/2014 | Krishnaswamy | .... | H04N 1/6086 |
| | | | | 382/167 |
| 2019/0236808 A1* | 8/2019 | Cohen | ................... | G06T 11/001 |

OTHER PUBLICATIONS

Yuan-Yuan Su et al., "Emotion-based color transfer of images using adjustable color combinations," Soft Computing, vol. 23, No. 3, 2019, pp. 1007-1020 (Abstract Included).

Bo Tranberg, "Determining dominant colors in images using clustering," Apr. 2018, Retrieved from the Internet: https://tberg.dk/post/determining-dominant-colors/, pp. 1-13.

* cited by examiner

| Pixel Char. Vector 310 | Hue Value 312 | Chroma Value 314 | Brightness Value 316 | Coords 318 | Foreground/ Background Label 320 | Feature/Object Label 322 | Other Labels 324 |
|---|---|---|---|---|---|---|---|

Figure 3

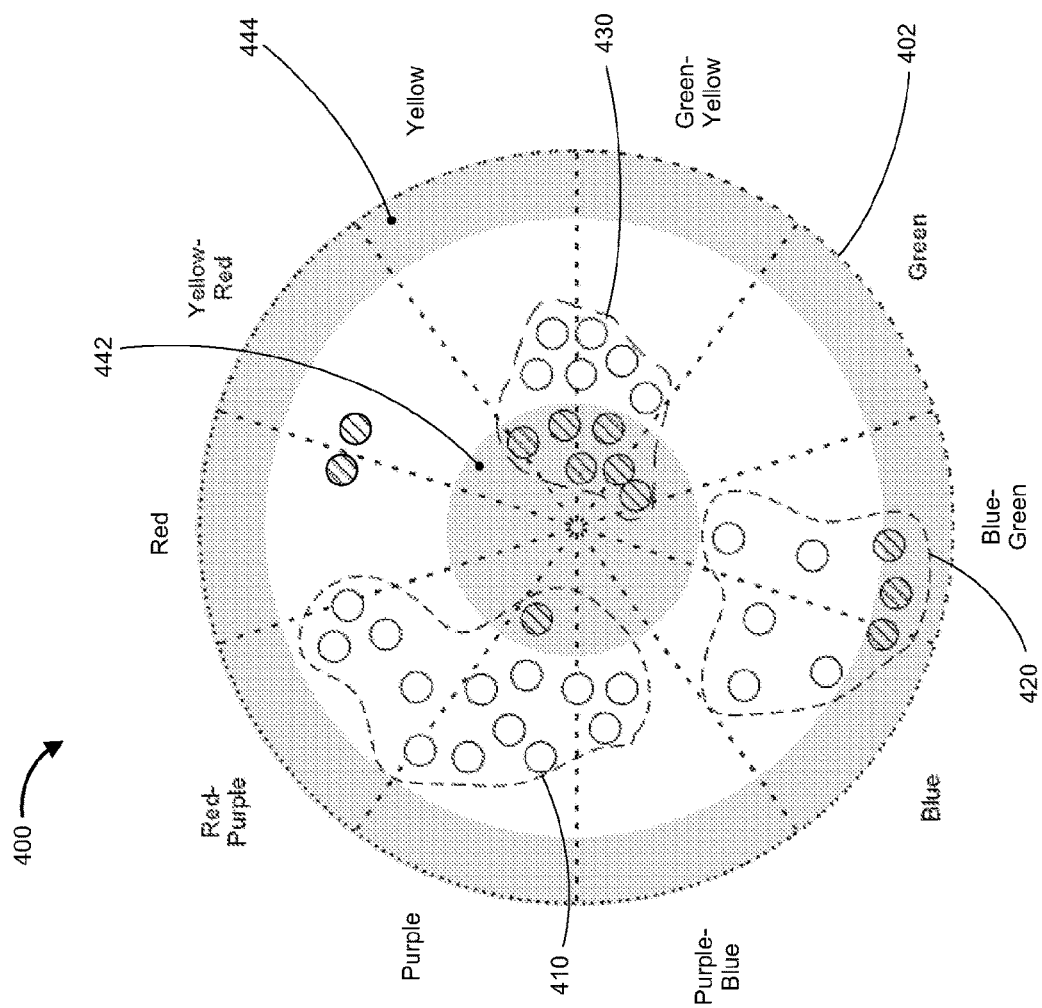

METHOD AND DEVICE FOR GENERATING A RESULTANT IMAGE BASED ON COLORS EXTRACTED FROM AN INPUT IMAGE

TECHNICAL FIELD

The present disclosure generally relates to image processing, and in particular, to systems, methods, and devices for generating a resultant image (e.g., a color gradient) based on colors extracted from an input image.

BACKGROUND

Often an image is used as a wallpaper for a home screen user interface. However, it can be difficult to view the image being used as the wallpaper because a plurality of application icons being within the home screen user interface overlaid on the image. Therefore, it would be advantageous to automatically generate a wallpaper for the home screen user interface that is, for example, a color gradient based on an image set as a wallpaper for a wake screen user interface.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 illustrates an example data structure for pixel characterization vectors in accordance with some implementations.

FIGS. 4A-4F illustrate an example pixel clustering scenario in accordance with some implementations.

Figure 1A:
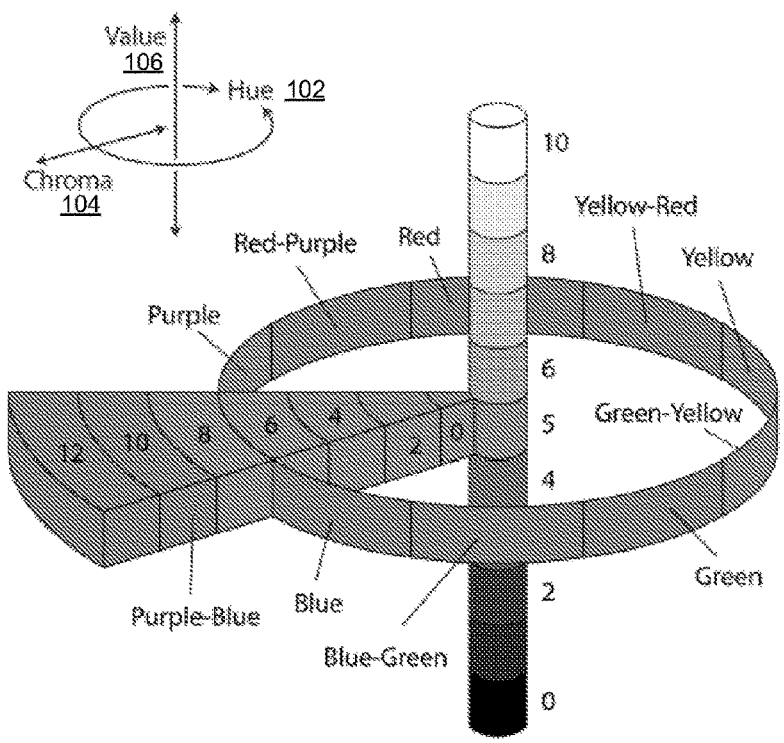
FIG. 1A illustrates an example color space in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a resultant image (e.g., a second image such as a color gradient) based on colors extracted from an input image (e.g., a first image). According to some implementations, the method is performed at a device including non-transitory memory and one or more processors coupled with the non-transitory memory. The method includes: obtaining a first image; determining one or more characterization properties for each of a plurality of pixels within the first image; determining a dominant hue based on the one or more characterization properties for each of the plurality of pixels within the first image; determining a plurality of hues that satisfy a predetermined perception threshold relative to the dominant hue based on the one or more characterization properties for each of the plurality of pixels within the first image, wherein the plurality of hues is different from the dominant hue; and generating a second image based at least in part on the dominant hue and the plurality of hues.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The implementations described herein include a method and device for generating a resultant image (e.g., a color gradient) based on colors extracted from an input image. In some implementation, the resultant image corresponds to a color gradient based on a portion of pixels within an input image. Often an image is used as a wallpaper for a home screen user interface. However, it can be difficult to view the image being used as the wallpaper because a plurality of application icons being within the home screen user interface overlaid on the image. Therefore, it would be advantageous to automatically generate a wallpaper for the home screen user interface that is a color gradient or solid color based on an image set as a wallpaper for a wake screen user interface. As such, visual continuity is maintained when transitioning from the wake screen user interface to the home screen user interface and one may feel as if he/she is drilling down into the wallpaper associated with the wake screen user interface. Providing visual continuity between user interfaces reduces visual stress and also reduces visual clutter. As such, the method reduces the cognitive burden on a user when interacting with user interfaces, thereby creating a more efficient human-machine interface.

FIG. 1A illustrates an example of a perceptual color space 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

To that end, as a non-limiting example, the color space 100 corresponds to the Munsell Color System. According to some implementations, the color space 100 specifies colors based on three visual properties: (A) hue 102; (B) chroma 104 associated with the amount of a color judged in proportion to a neutral (gray) color of the same value; and (C) value 106 associated with the brightness, lightness, or luminosity of a color. As shown in FIG. 1A, the color space 100 includes three independent properties of color which are represented cylindrically in three dimensions as an irregular color solid: (A) the hue 102, measured by degrees around horizontal circles; (B) the chroma 104, measured radially outward from the neutral (gray) vertical axis; and (C) the value 106, measured vertically on the core cylinder from 0 (black) to 10 (white). As such, in some implementations, the cylindrical representation of the color space 100 may be divided into a plurality of circular slices stacked along the vertical axis associated with the value 106 (brightness).

Each circular slice of the color space 100 is divided into five principal hues: Red, Yellow, Green, Blue, and Purple, along with 5 intermediate hues (e.g., Yellow-Red) halfway between adjacent principal hues. Value, or lightness, varies vertically along the color solid, from black (value 0) at the bottom, to white (value 10) at the top. Neutral grays lie along the vertical axis between black and white. Chroma, measured radially from the center of each slice, represents the relative amount of a color, with lower chroma being less pure (more washed out, as in pastels). As such, a color is fully specified by listing the three numbers for hue, value, and chroma.

Figure 1B:
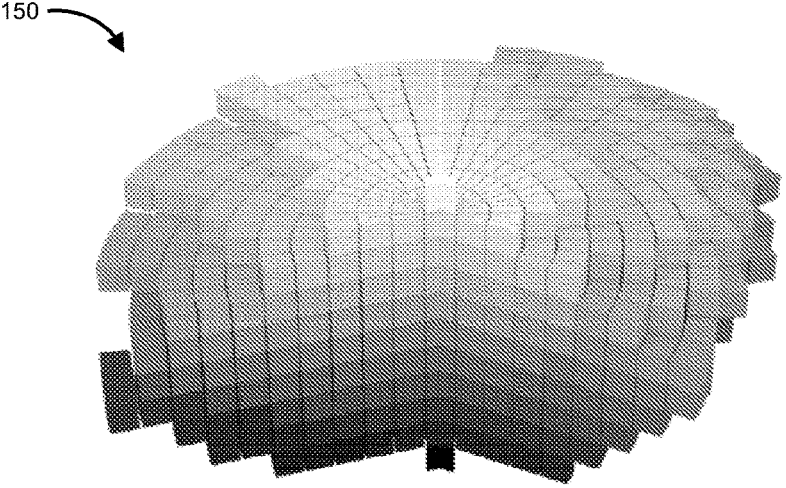
FIG. 1B illustrates an example three-dimensional (3D) representation of the color space in FIG. 1A in accordance with some implementations.

FIG. 1B illustrates an example three-dimensional (3D) representation 150 of the color space 100 in FIG. 1A in accordance with some implementations. Instead of a regular geometric cylinder, sphere, pyramid, or the like, the 3D representation 150 is irregular. For example, Munsell determined the spacing of colors along these dimensions by taking measurements of human visual responses. In each dimension, Munsell colors are as close to perceptually-uniform as he could make them, which makes the resulting shape quite irregular. For instance, perceptually we see that the highest chroma of yellow hues have a much higher value than the highest chroma blues. As such, the color space 100 and the 3D representation thereof is related to human perception of colors. One of ordinary skill in the art will appreciate that the color space 100 in FIG. 1A and the 3D representation 150 thereof in FIG. 1B (associated with the Munsell Color System) may be replaced by various other color systems that are also associated with human perception and human visual responses such as IPT, CIECAM02, CIELAB, iCAM06, or the like. One of ordinary skill in the art will appreciate that the color space 100 in FIG. 1A and the 3D representation 150 thereof in FIG. 1B (associated with the Munsell Color System) may be replaced by various other color systems that are not associated with human perception such as RGB, RGBA, CMYK, HSL, HSV, YIQ, YCbCr, or the like.

Figure 2:
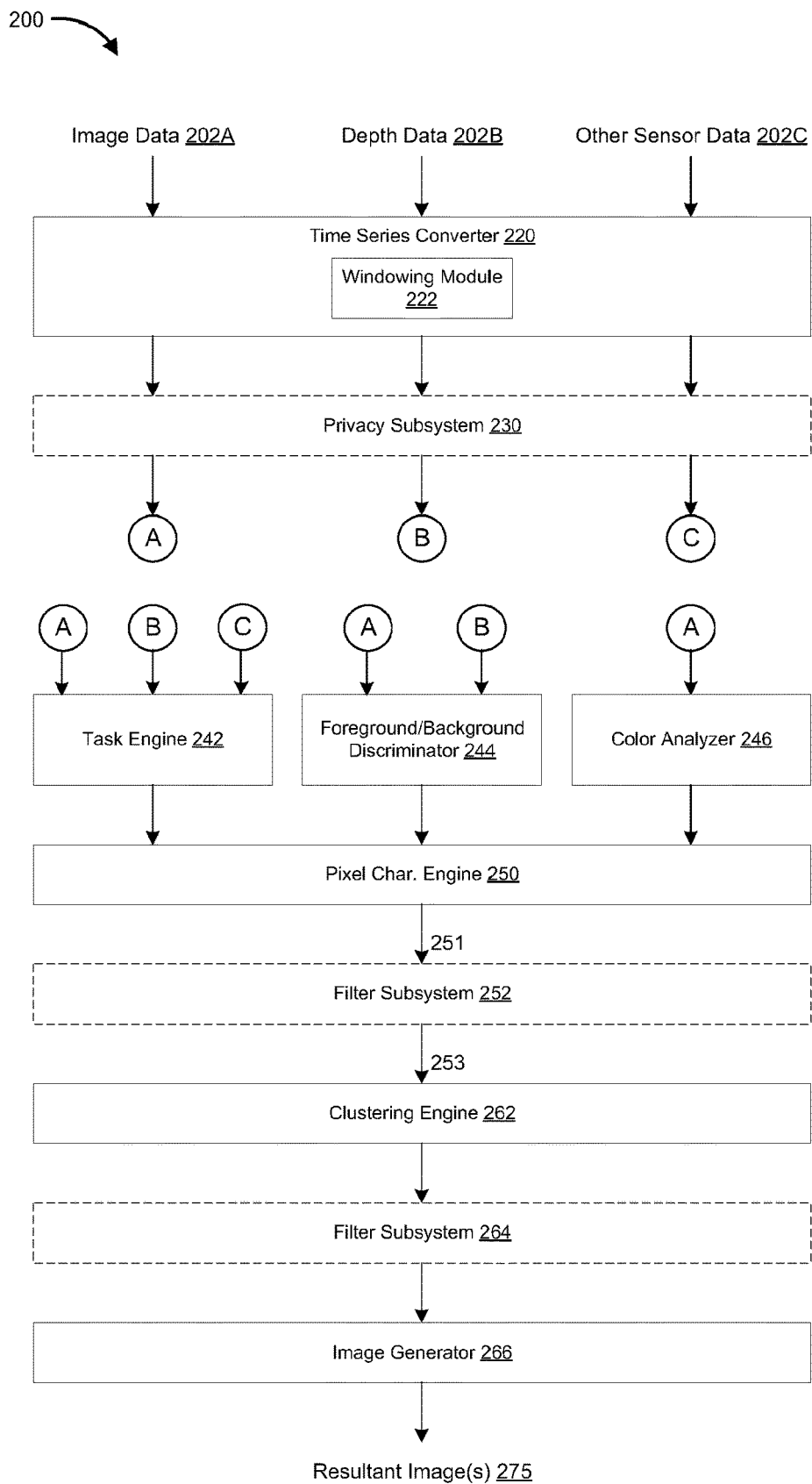
FIG. 2 illustrates an example data processing architecture in accordance with some implementations.

FIG. 2 illustrates an example data processing architecture 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the data processing architecture 200 (or at least a portion thereof) is included in or integrated with the electronic device 800 shown in FIG. 8.

As shown in FIG. 2, the data processing architecture 200 obtains input data associated with a plurality of modalities, including image data 202A, depth data 202B, and other sensor data 202C. In some implementations, the image data 202A corresponds to one or more images obtained by the electronic device 800. For example, the electronic device 800 receives the image data 202A from a local source (e.g., a solid-state drive (SSD), a hard-disk drive (HDD), or the like) or a remote source (e.g., another user's device, a cloud/file server, or the like). In another example, the electronic device 800 retrieves the image data 202A from a local source (e.g., an SSD, an HDD, or the like) or a remote source (e.g., another user's device, a cloud/file server, or the like). In yet another example, the electronic device 800 captures the image data 202A with an exterior- or interior-facing image sensor (e.g., one or more cameras). As one example, the image data 202A includes an image that is currently set as the background or wallpaper for a wake screen user interface of the electronic device 800.

In some implementations, the depth data 202B characterizes a scene or physical environment associated with the image data 202A. As one example, assuming the image data 202A includes an image of a person's face, the depth data 202B may include a 3D mesh map associated with the person's face. As another example, assuming the image data 202A includes a living room scene, the depth data 202B may include a 3D point cloud associated with the living room scene. In some implementations, the other sensor data 202C characterizes the scene or physical environment associated with the image data 202A or includes other metadata associated with the image data 202A. As one example, the other sensor data 202C may include eye tracking information associated with a user, ambient audio data associated with the scene or physical environment, ambient lighting measurements associated with the scene or physical environment, environmental measurements associated with the scene or physical environment (e.g., temperature, humidity, pressure, etc.), physiological measurements (e.g., pupil dilation, gaze direction, heart-rate, etc.) associated with a subject within the scene or physical environment, and/or the like.

According to some implementations, the image data 202A corresponds to an ongoing or continuous time series of images or values. In turn, the times series converter 220 is configured to generate one or more temporal frames of image data from a continuous stream of image data. Each temporal frame of image data includes a temporal portion of the image data 202A. In some implementations, the times series converter 220 includes a windowing module 222 that is configured to mark and separate one or more temporal frames or portions of the image data 202A for times $T_1$, $T_2$, ..., $T_N$. In some implementations, each temporal frame of the image data 202A is conditioned by a pre-filter or otherwise pre-processed (not shown).

According to some implementations, the depth data 202B corresponds to an ongoing or continuous time series of values. In turn, the times series converter 220 is configured to generate one or more temporal frames of depth data from a continuous stream of audio data. Each temporal frame of depth data includes a temporal portion of the depth data 202B. In some implementations, the times series converter 220 includes the windowing module 222 that is configured to mark and separate one or more temporal frames or portions of the depth data 202B for times $T_1, T_2, \ldots, T_N$. In some implementations, each temporal frame of the depth data 202B is conditioned by a pre-filter or otherwise pre-processed (not shown).

According to some implementations, the other sensor data 202C corresponds to an ongoing or continuous time series of values. In turn, the times series converter 220 is configured to generate one or more temporal frames of other sensor data from a continuous stream of other sensor data. Each temporal frame of other sensor data includes a temporal portion of the other sensor data 202C. In some implementations, the times series converter 220 includes the windowing module 222 that is configured to mark and separate one or more temporal frames or portions of the other sensor data 202C for times $T_1, T_2, \ldots, T_N$. In some implementations, each temporal frame of the other sensor data 202C is conditioned by a pre-filter or otherwise pre-processed (not shown).

In various implementations, the data processing architecture 200 includes a privacy subsystem 230 that includes one or more privacy filters associated with user information and/or identifying information (e.g., at least some portions of the image data 202A, the depth data 202B, and the other sensor data 202C). In some implementations, the privacy subsystem 230 selectively prevents and/or limits the data processing architecture 200 or portions thereof from obtaining and/or transmitting the user information. To this end, the privacy subsystem 230 receives user preferences and/or selections from the user in response to prompting the user for the same. In some implementations, the privacy subsystem 230 prevents the data processing architecture 200 from obtaining and/or transmitting the user information unless and until the privacy subsystem 230 obtains informed consent from the user. In some implementations, the privacy subsystem 230 anonymizes (e.g., scrambles or obscures) certain types of user information. For example, the privacy subsystem 230 receives user inputs designating which types of user information the privacy subsystem 230 anonymizes. As another example, the privacy subsystem 230 anonymizes certain types of user information likely to include sensitive and/or identifying information, independent of user designation (e.g., automatically).

In some implementations, the task engine 242 is configured to perform one or more tasks on the image data 202A, the depth data 202B, and/or the other sensor data 202C in order to detect objects, features, activities, and/or the like associated with the input data. In some implementations, the task engine 242 is configured to detect one or more features within the image data 202A (e.g., lines, edges, corners, ridges, shapes, etc.) based on various computer vision techniques and to label pixels within an image based thereon. In some implementations, the task engine 242 is configured to recognize one or more objects within the image data 202A based on various computer vision techniques, such as semantic segmentation or the like, and to label pixels within an image based thereon. In some implementations, the task engine 242 is configured to determine the visual salience of the one or more objects recognized within the image data 202A based on eye tracking information and various computer vision techniques to determine the user's fixation point and/or the importance of each of the one or more objects.

In some implementations, the foreground/background discriminator 244 is configured to label pixels within an image as foreground and/or background pixels based on the depth data 202B. In some implementations, the color analyzer 246 is configured to determine color properties for pixels within an image such as hue, chroma, and brightness values.

In some implementations, a pixel characterization engine 250 is configured to generate pixel characterization vectors 251 for at least some of the pixels of an image within the image data 202A based on the output of the task engine 242, the foreground/background discriminator 244, and/or the color analyzer 246. According to some implementations, the pixel characterization vectors 251 include a plurality of characterization properties for each pixel of the image. In some implementations, each pixel is associated with a pixel characterization vector that includes the characterization properties (e.g., hue value, chroma value, brightness value, coordinates, various labels, and/or the like). An example pixel characterization vector 310 is described in more detail below with reference to FIG. 3.

As shown in FIG. 3, a pixel characterization vector 310 for a respective pixel in the image includes: a hue value 312 for the respective pixel, a chroma value 314 for the respective pixel, a brightness value 316 for the respective pixel, coordinates 318 for the respective pixel (e.g., 2D image plane for the respective pixel and optionally 3D absolute coordinates for an object associated with the respective pixel), a foreground or background label 320 for the respective pixel, one or more feature/object labels 322 for the respective pixel, and one or more other labels 324 for the respective pixel.

In some implementations, the optional filter subsystem 252 is configured to apply one or more filters or constraints to the pixel characterization vectors 251 in order to generate a filtered set of pixel characterization vectors 253. For example, the filter subsystem 252 removes pixel characterization vectors that include a foreground label. In another example, the filter subsystem 252 removes pixel characterization vectors that include a background label. In yet another example, the filter subsystem 252 removes pixel characterization vectors that are not associated with a feature/object label. In yet another example, the filter subsystem 252 removes pixel characterization vectors that are not associated with a predefined set of feature labels (e.g., circles, lines, squares, blocks, cylinders, etc.). In yet another example, the filter subsystem 252 removes pixel characterization vectors that are not associated with a predefined set of object labels (e.g., plants, foliage, animals, humans, human faces, human skin, sky, etc.). In yet another example, the filter subsystem 252 removes pixel characterization vectors that are associated with hue values within one or more predefined ranges of restricted hues. In yet another example, the filter subsystem 252 removes pixel characterization vectors that are associated with chroma values outside of a predefined chroma range. In yet another example, the filter subsystem 252 removes pixel characterization vectors that are associated with brightness values outside of a predefined brightness range. For example, the filter subsystem 252 removes pixel characterization vectors that are associated with low visual saliency. In yet another example, the filter subsystem 252 removes pixel characterization vectors that are associated with pixel coordinates near the edges or periphery of the image data 202A.

In some implementations, the optional filter subsystem 252 is configured to apply one weights to the pixel characterization vectors 251 based on the above-mentioned filters or constraints instead of removing pixel characterization vectors. As a result, in some implementations, the image generator 266 may generate the one or more resultant images 275 based on pixels that are associated with pixel characterization vectors that have a weight that is greater than a predefined value. According to some implementations, the image generator 266 may sort the portions within a resultant image based on the weights of the corresponding pixel characterization vectors.

In some implementations, a clustering engine 262 is configured to perform a clustering algorithm (e.g., k-means clustering, a k-means clustering variation, or another clustering algorithm) on the pixels associated with the filtered set of pixel characterization vectors 253 based on at least some characterization properties thereof (e.g., hue values, chroma values, brightness values, or a suitable combination thereof). Performance of the clustering algorithm is described in greater detail below with reference to FIGS. 4A-4F. In some implementations, after clustering the pixels associated with the filtered set of pixel characterization vectors 253, the optional filter subsystem 264 is configured to apply one or more filters or constraints to the pixels associated with the filtered set of pixel characterization vectors 253. Application of some post-clustering filters or constraints are described in greater detail below with reference to FIGS. 4A-4F.

FIGS. 4A-4F illustrate an example pixel clustering scenario 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the pixel clustering scenario 400 is performed by the electronic device 800 shown in FIG. 8 or a component thereof such as the clustering engine 262 or the filter subsystem 264.

Figure 4A:
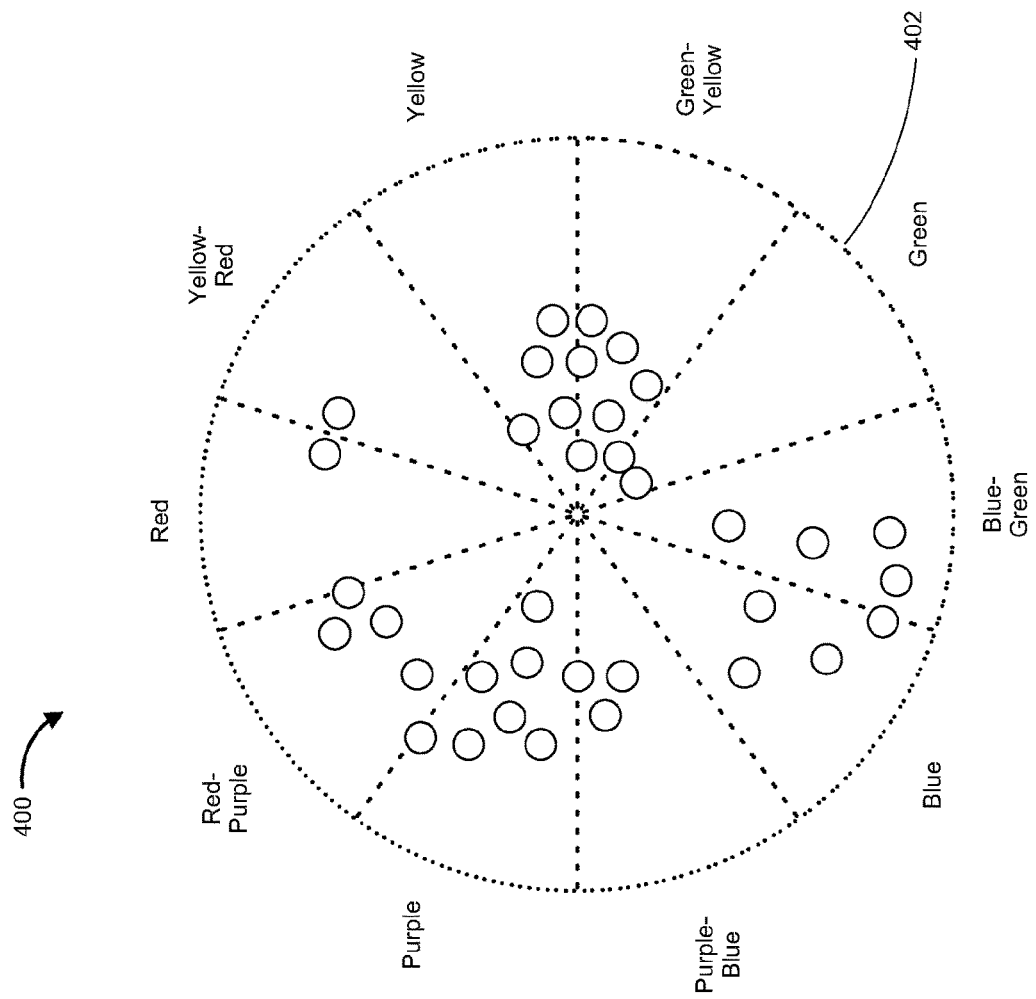

As shown in FIG. 4A, the electronic device 800 or a component thereof (e.g., the clustering engine 262) plots the pixels associated with the filtered set of pixel characterization vectors 253 against a 2D color space 402 based on the hue and chroma values thereof. One of ordinary skill in the art will appreciate that the pixels may be plotted against a 3D color space based on their hue, chroma, and brightness values, but the 2D color space 402 is used in this example for sake of simplicity.

As shown in FIGS. 4A-4F, the 2D color space 402 is divided into five principal hues: Red, Yellow, Green, Blue, and Purple, along with 5 intermediate hues (e.g., Yellow-Red) halfway between adjacent principal hues. One of ordinary skill in the art will appreciate that the number of hue regions or divisions within the color space 402 in FIGS. 4A-4F may be an arbitrary number in various other implementations. The hue values are measured by degrees around the 2D color space 402. Chroma values measured radially outward from the center (neutral gray) of the 2D color space 402. As such, undersaturated colors are located closer to the center of the 2D color space 402 and oversaturated colors are located closer to the outside edge of the 2D color space 402. According to some implementations, if two or more pixels have the same hue and chroma values, the clustering engine 262 may associate a counter that indicates the number of pixels associated with a sample when plotting the pixels against the 2D color space 402.

Figure 4B:
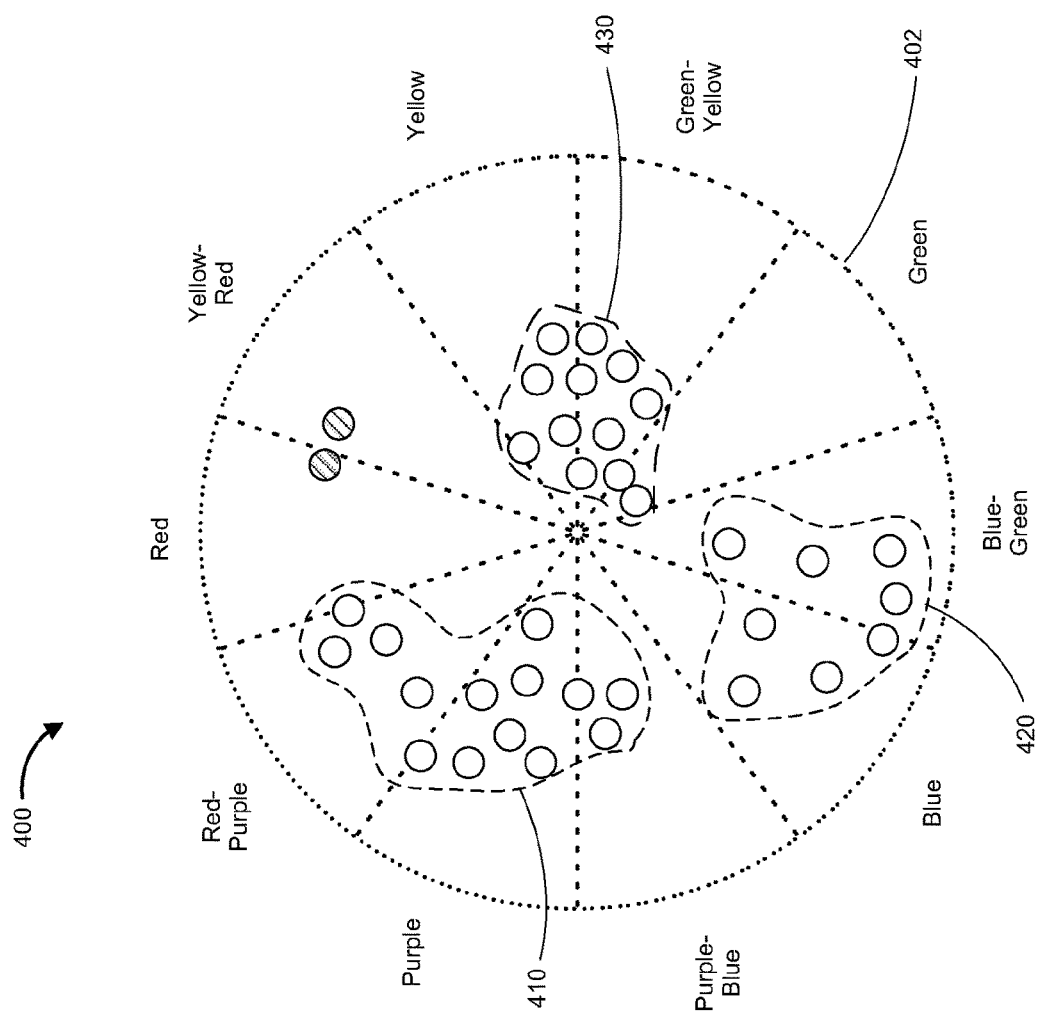

As shown in FIG. 4B, the electronic device 800 or a component thereof (e.g., the clustering engine 262) divides the pixels into k clusters based on a k-means clustering algorithm. Here, assuming k=3, the clustering engine 262 divides the pixels into three (3) clusters, including clusters 410, 420, and 430. As shown in FIG. 4B, two pixels in the Red and Yellow-Red regions outside of the clusters 410, 420, and 430 are displayed with a cross-hatching pattern to indicate that those pixels have been removed.

As shown in FIG. 4C, the electronic device 800 or a component thereof (e.g., the filter subsystem 264) removes undersaturated pixels within a first chroma exclusion region 442. In FIG. 4C, pixels within the first chroma exclusion region 442 are displayed with the cross-hatching pattern to indicate that those pixels have been removed. As shown in FIG. 4C, the filter subsystem 264 also removes oversaturated pixels within a second chroma exclusion region 444. In FIG. 4C, pixels within the second chroma exclusion region 444 are displayed with the cross-hatching pattern to indicate that those pixels have been removed. According to some implementations, the removal of undersaturated and oversaturated pixels is optional. According to some implementations, the width of the first chroma exclusion region 442 and the second chroma exclusion region 444 may be predefined or deterministic.

Figure 4D:
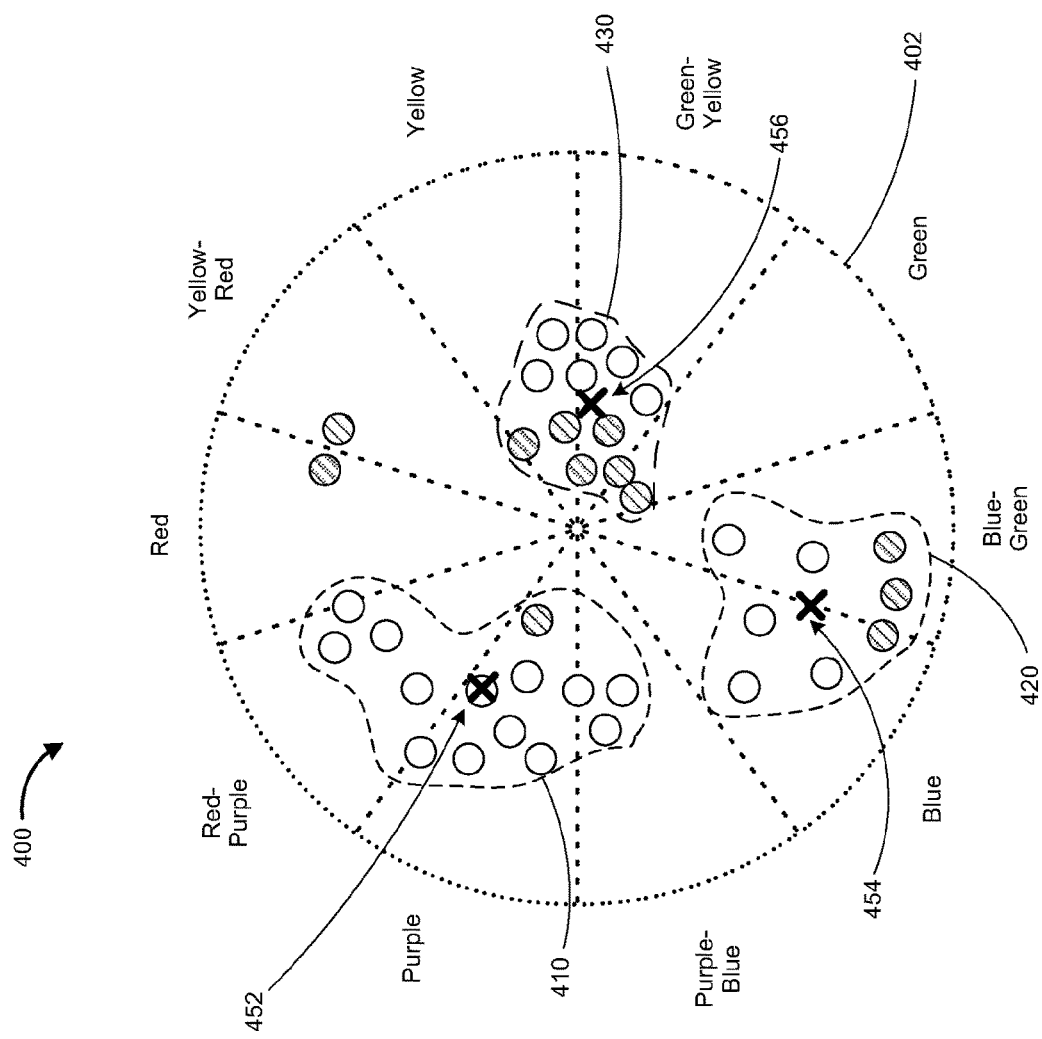

As shown in FIG. 4D, the electronic device 800 or a component thereof (e.g., the filter subsystem 264) determines a center of mass or centroid for each of the clusters 410, 420, and 430. In FIG. 4D, a centroid 452 indicates the center of mass or centroid of the cluster 410. In FIG. 4D, a centroid 454 indicates the center of mass or centroid of the cluster 420. In FIG. 4D, a centroid 456 indicates the center of mass or centroid of the cluster 430.

Figure 4E:
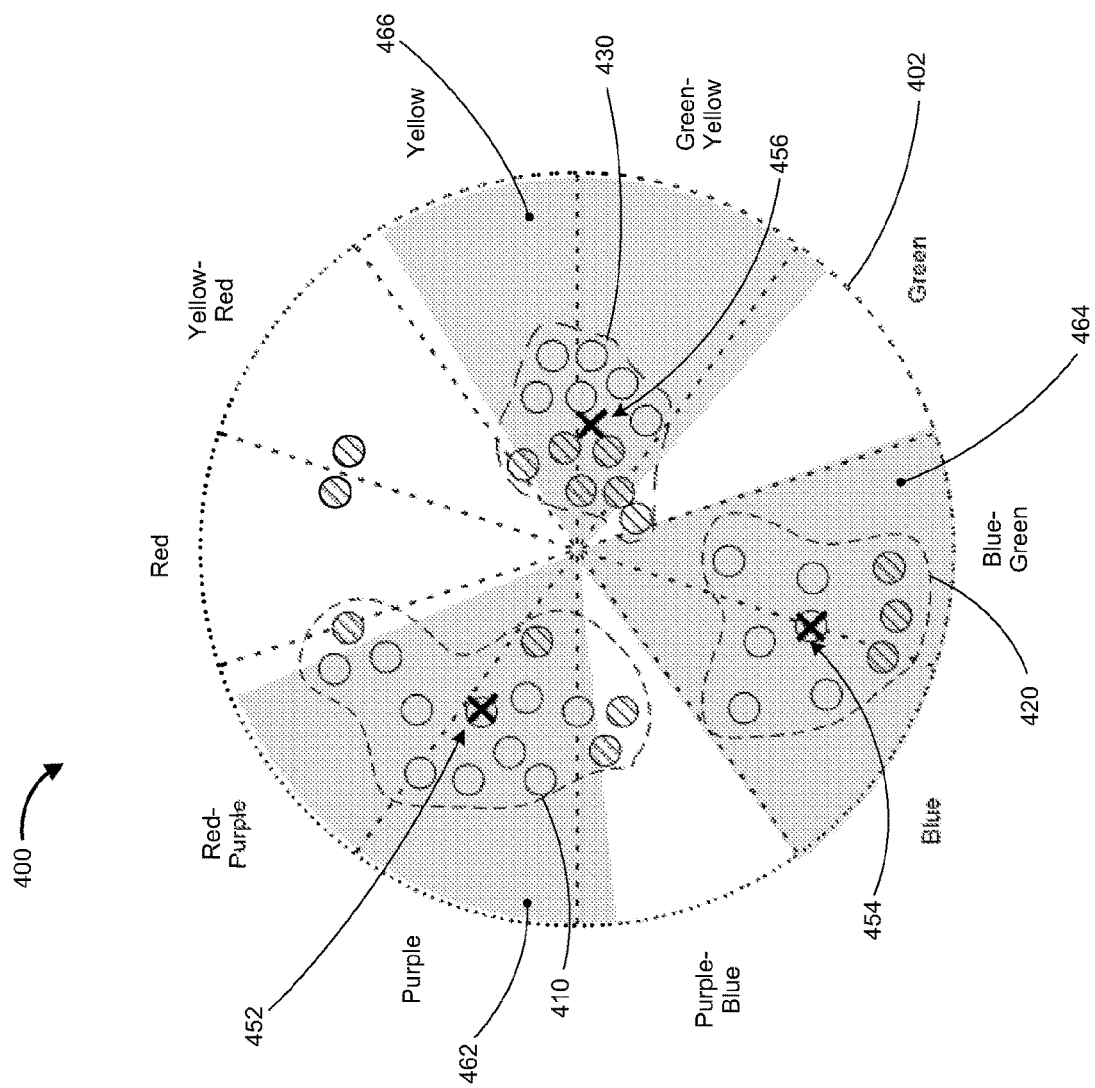

As shown in FIG. 4E, the electronic device 800 or a component thereof (e.g., the filter subsystem 264) determines a first hue inclusion region 462 that corresponds to X° (e.g., 10) on either side of the centroid 452 and removes pixels associated with the cluster 410 that are outside of the first hue inclusion region 462. In FIG. 4E, pixels within the cluster 410 and also within the purple-blue region are displayed with the cross-hatching pattern to indicate that those pixels have been removed. According to some implementations, a pixel that was previously not within the cluster 410 or removed based on previous filters may be re-included or re-associated with the cluster 410 if the pixel is within the first hue inclusion region 462. According to some implementations, the number of degrees associated with the first hue inclusion region 462 may be predefined or deterministic.

As shown in FIG. 4E, the electronic device 800 or a component thereof (e.g., the filter subsystem 264) determines a second hue inclusion region 464 that corresponds to X° on either side of the centroid 454 and removes pixels associated with the cluster 420 that are outside of the second hue inclusion region 464. As shown in FIG. 4E, the electronic device 800 or a component thereof (e.g., the filter subsystem 264) determines a third hue inclusion region 466 that corresponds to X° on either side of the centroid 456 and removes pixels associated with the cluster 430 that are outside of the third hue inclusion region 466.

Figure 4F:
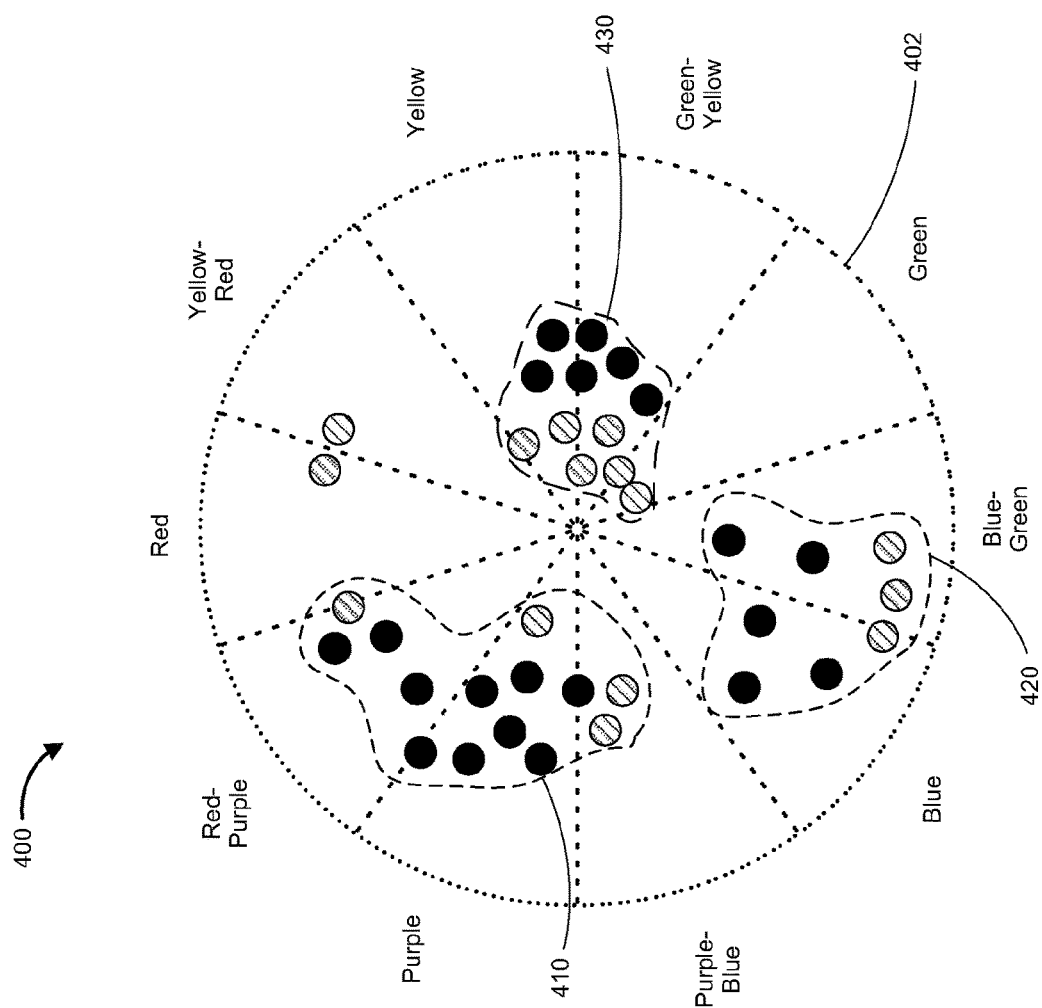

As shown in FIG. 4F, the electronic device 800 or a component thereof (e.g., the clustering engine 262) identifies candidate pixels for the image generator 266. In FIG. 4F, candidate pixels are displayed with a solid black fill.

With reference to FIG. 2, in some implementations, an image generator 266 is configured to generate one or more resultant images 275. As one example, the image generator 266 generates the one or more resultant images 275 based on the candidate pixels, which are displayed with a solid black fill in FIG. 4F. As another example, the image generator 266 generates a resultant image based on a portion of the candidate pixels that are within the cluster with the most candidate pixels such as the cluster 410 in FIG. 4F. As yet another example, the image generator 266 generates M resultant images based on a portion of the candidate pixels that are within the M clusters with the most candidate pixels in FIG. 4F. In this example, assuming M=2, the image generator 266 generates a first resultant image using the candidate pixels within the cluster 410 and a second resultant image using the candidate pixels within the cluster 420. In this example, M≤k associated with the k-means clustering algorithm.

Figure 5:
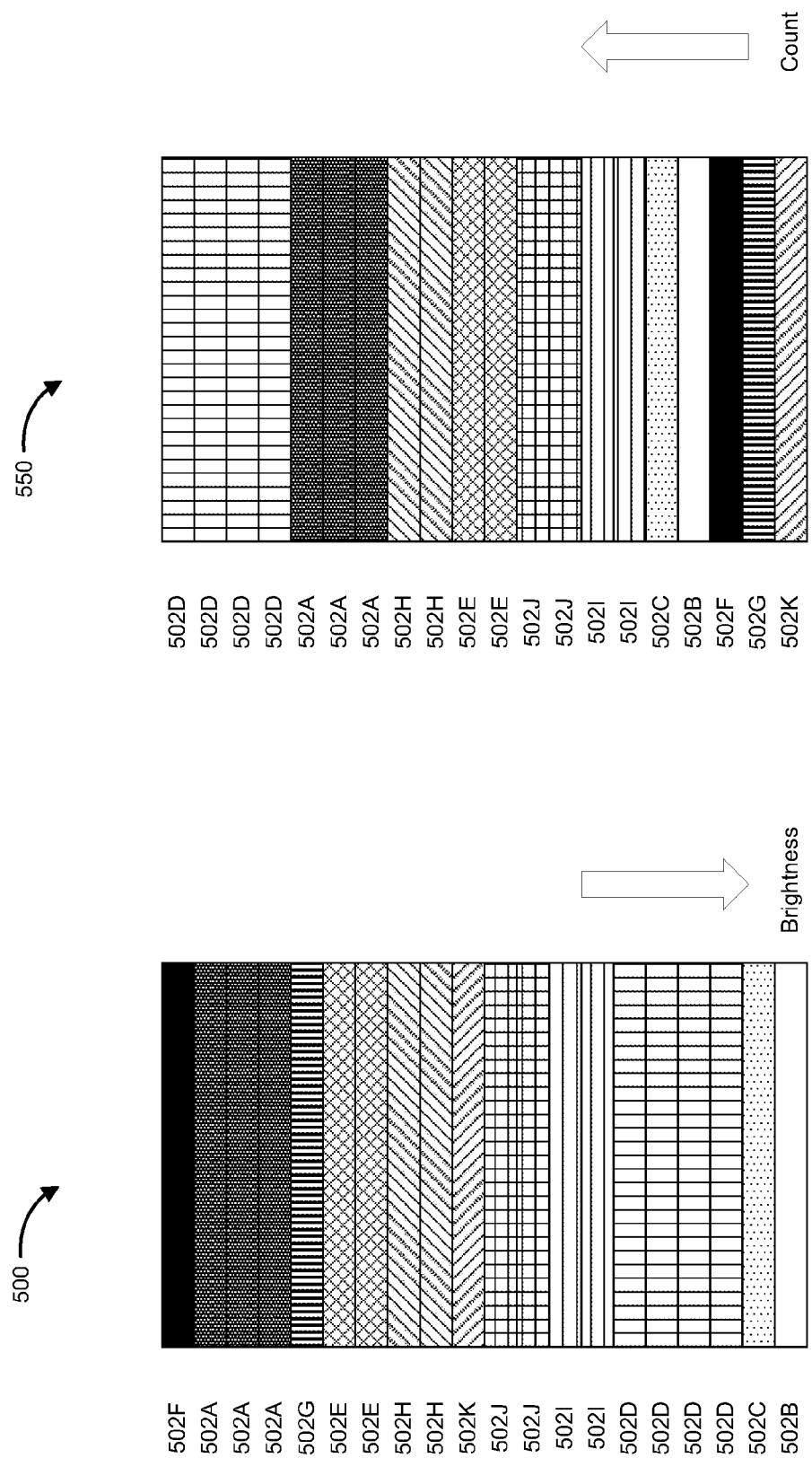
FIG. 5 illustrates representations of resultant images in accordance with some implementations.

FIG. 5 illustrates representations of resultant images 500 and 550 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. For example, FIG. 5 shows a representation of a first resultant image 500 associated with a set of candidate pixels (e.g., the remaining pixels within the cluster 410 displayed with the black fill in FIG. 4F). For example, the first resultant image 500 includes a plurality of portions 502A-502K (sometimes referred to herein as the portions 502). According to some implementations, each of the portions 502 is associated with a respective pixel within the set of candidate pixels. In some implementations, the portions 502 correspond to horizontal regions, vertical regions, diagonal regions, or the like. One of ordinary skill in the art will appreciate that the portions 502 may associated with myriad shapes, geometries, divisions, or the like.

In some implementations, the image generator 266 generates each of the portions 502 based on hue and chroma values for a respective pixel within the set of candidate pixels. As such, for example, a portion 502B is generated based on hue and chroma values for a respective pixel within the set of candidate pixels. In some implementations, the image generator 266 performs a fading, smoothing, blending, interpolating, and/or the like operation between each of the portions 502. As such, the first resultant image 500 may resemble a color gradient.

As shown in FIG. 5, the first resultant image 500 includes four (4) portions 502D because the set of candidate pixels includes four (4) pixels with same hue and chroma values. Similarly, the first resultant image 500 includes two (2) portions 502A because the set of candidate pixels includes two (2) pixels with the same hue and chroma values.

As shown in FIG. 5, the portions 502 within the first resultant image 500 are arranged based on the brightness values of the associated pixels from most bright on the bottom to least bright on the top. As such, with reference to the first resultant image 500, a first portion 502B of the first resultant image 500 is generated based on the hue and chroma values of a corresponding first candidate pixel from the set of candidate pixels that is associated with a highest brightness value. Furthermore, with reference to the first resultant image 500, an N-th portion 502F of the first resultant image 500 is generated based on the hue and chroma values of a corresponding N-th candidate pixel from the set of candidate pixels that is associated with a lowest brightness value.

As another example, FIG. 5 shows a representation of a second resultant image 550 associated with the set of candidate pixels. The second resultant image 550 is similar to and adapted from the first resultant image 500. As such, similar references numbers are used and only the differences are discussed for the sake of brevity. As shown in FIG. 5, the portions 502 within the second resultant image 550 are arranged based on pixel instance count from least on the bottom to most on the top. As such, with reference to the second resultant image 550, a portion 502K of the second resultant image 550 is generated based on the hue and chroma values of a corresponding candidate pixel from the set of candidate pixels with a count of one (1) pixel instance within the set of candidate pixels. Furthermore, with reference to the second resultant image 550, four (4) portions 502D of the second resultant image 550 are generated based on the hue and chroma values of a corresponding candidate pixel from the set of candidate pixels that is associated with a count of four (4) pixel instances within the set of candidate pixel. One of ordinary skill in the art will appreciate that the portions 502 may be arranged or sorted in myriad ways other than based on brightness or pixel instance count (e.g., hue value, chroma value, weight set by the filter subsystem 252, or the like).

Figure 6A:
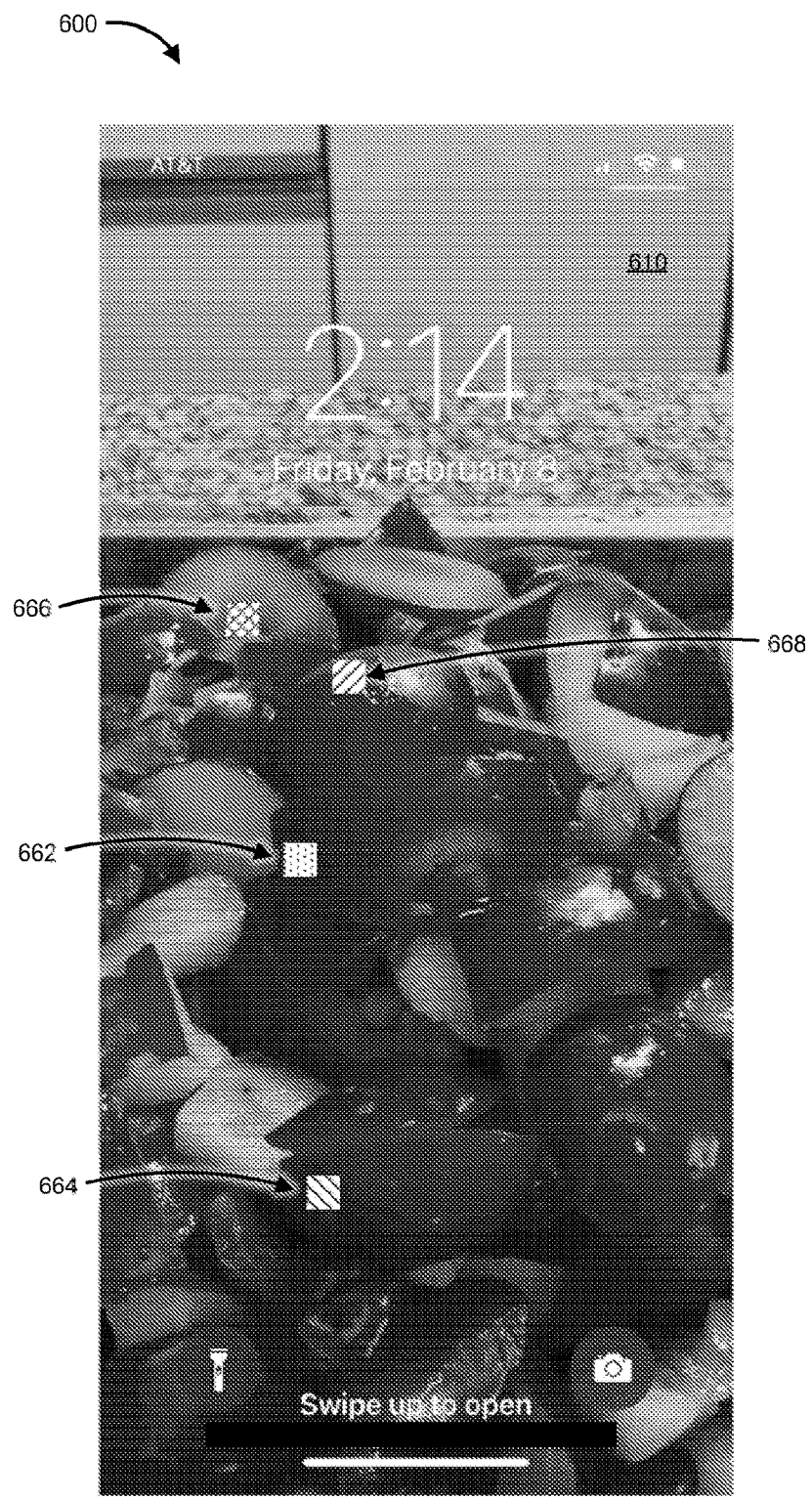
FIG. 6A illustrates an example input image set as a background for a wake screen user interface in accordance with some implementations.

FIG. 6A illustrates an example input image 610 set as a wallpaper for a wake screen user interface 600 in accordance with some implementations. For example, the input image 610 (e.g., the image data 202A) is fed into the data processing system 200 along with associated metadata. As shown in FIG. 6A, the input image 610 includes pixels 662, 664, 666, and 668 associated with related colors (shown as different crosshatch patterns). As one example, the pixels 662, 664, 666, and 668 are associated with hue and chroma values that correspond to different shades of red within the input image 610, wherein, for example, the pixel 662 is associated with the dominant hue/shade.

Figure 6B:
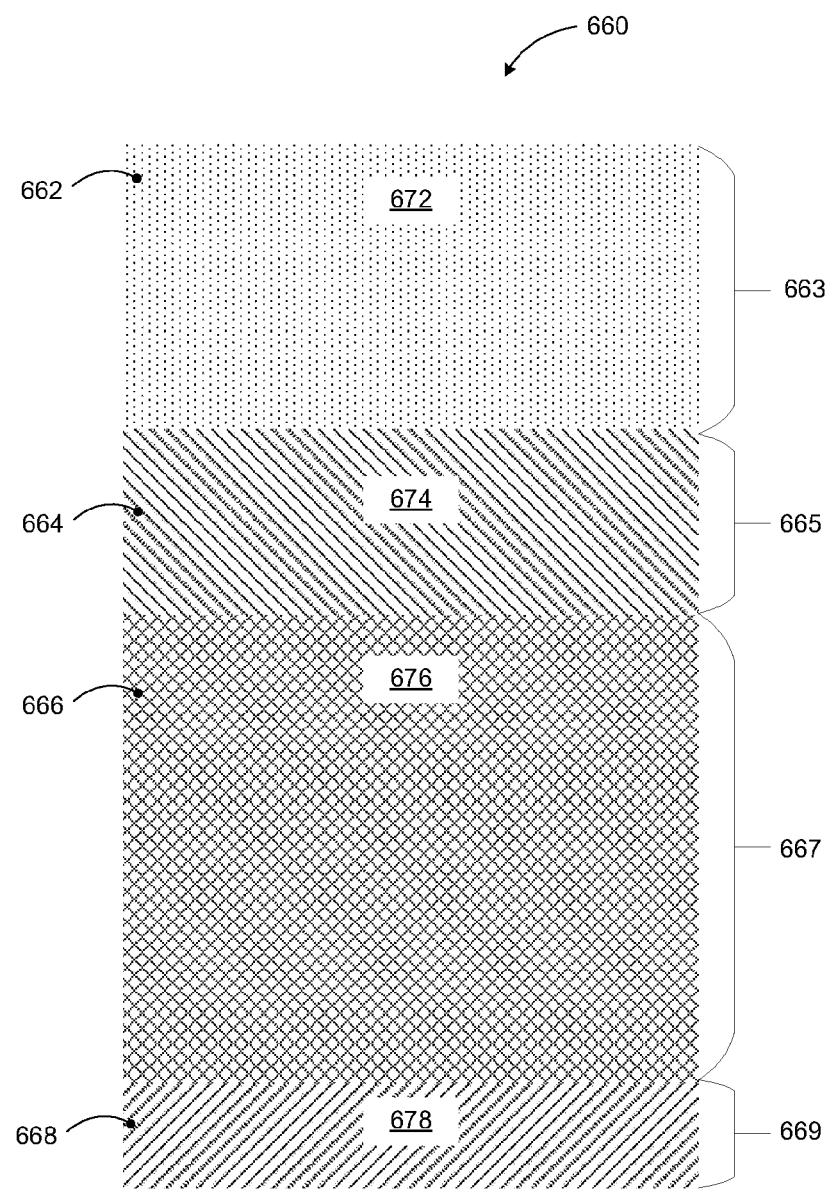
FIG. 6B illustrates an example resultant image generated based on the input image in FIG. 6A in accordance with some implementations.

FIG. 6B illustrates an example resultant image 660 (e.g., one of the one or more resultant images 275) generated by the data processing system 200 based on the input image 610 in accordance with some implementations. For example, with reference to FIG. 2, the color analyzer 246 determines hue, chroma, and brightness values for the pixels within the input image 610 (e.g., including the pixels 662, 664, 666, and 668), and the clustering engine 262 plots the pixels within the input image 610 against a color space (e.g., the 2D color space 402 in FIGS. 4A-4F) based on the hue and chroma values thereof. In this example, with continued reference to FIG. 2, the clustering engine 262 identifies a set of candidate pixels (e.g., the pixels 662, 664, 666, and 668) as described above with respect to the pixel clustering scenario 400 in FIG. 4A-4F, and the image generator 266 generates the resultant image 660 based on the set of candidate pixels (e.g., the pixels 662, 664, 666, and 668) or at least a portion thereof as described above with respect to FIG. 5. As such, the resultant image 660 corresponds to a color gradient generated based on the hue and chroma values associated with the pixels 662, 664, 666, and 668, which are closely related in terms of color (e.g., shades of red).

As shown in FIG. 6B, the resultant image includes a plurality of portions 672, 674, 676, and 678. A color of the portion 672 is based on the hue and chroma values of the pixel 662. Moreover, in some implementations, a dimension 663 (e.g., length) of the portion 672 is based on a pixel instance count that corresponds to a number of pixels in the input image 610 with the same hue and chroma values as the pixel 662 (or within a predefined variance thereof). Similarly, a color of the portion 674 is based on the hue and chroma values of the pixel 664. Moreover, in some implementations, a dimension 665 (e.g., length) of the portion 674 is based on a pixel instance count that corresponds to a number of pixels in the input image 610 with the same hue and chroma values as the pixel 66 (or within a predefined variance thereof).

A color of the portion 676 is based on the hue and chroma values of the pixel 666. Moreover, in some implementations, a dimension 667 (e.g., length) of the portion 676 is based on a pixel instance count that corresponds to a number of pixels in the input image 610 with the same hue and chroma values as the pixel 666 (or within a predefined variance thereof). Similarly, a color of the portion 678 is based on the hue and chroma values of the pixel 668. Moreover, in some implementations, a dimension 669 (e.g., length) of the portion 678 is based on a pixel instance count that corresponds to a number of pixels in the input image 610 with the same hue and chroma values as the pixel 668 (or within a predefined variance thereof).

For example, in response to detecting a user input that sets the input image 610 as the wallpaper of the wake screen user interface 600, the electronic device 800 or a component thereof (e.g., the data processing system 200 in FIG. 2) generates the resultant image 660 based on the input image 610 and sets the resultant image 660 as the wallpaper of the home screen user interface. As such, a visual continuity is maintained when transitioning from the wake screen user interface to the home screen user interface. For example, the user may perceive that he/she is drilling down into the background or foreground of the input image 610 set as the wallpaper for the wake screen user interface when transitioning from the wake screen user interface to the home screen user interface with the resultant image 660 set as its wallpaper. See U.S. Application No. 62/855,729, filed May 31, 2019, which is incorporated by reference herein in its entirety, for further description regarding setting wallpapers of the wake and home screen user interfaces.

Figure 7:
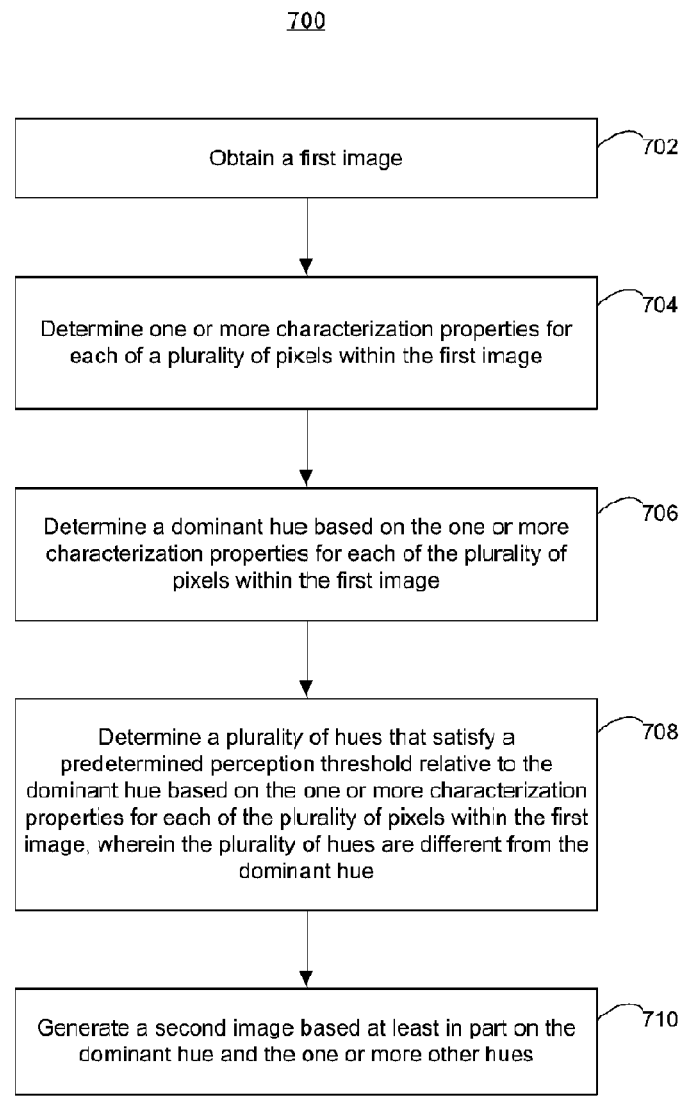
FIG. 7 is a flowchart representation of a method of generating a resultant image based on a portion of pixels within an input image in accordance with some implementations.

FIG. 7 is a flowchart representation of a method 700 of generating a resultant image based on a portion of pixels within an input image in accordance with some implementations. In various implementations, the method 700 is performed by a device with one or more processors and non-transitory memory (e.g., the electronic device 800 in FIG. 8) or a component thereof. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the device corresponds to one of a wearable computing device, mobile phone, tablet, laptop, desktop computer, kiosk, or the like. Some operations in method 700 are, optionally, combined and/or the order of some operations is, optionally, changed.

As described below, the method 700 generates a resultant image to be set as a wallpaper for a user interface (e.g., home screen) based on an input image set as the wallpaper for another user interface (e.g., wake screen) in order to maintain visual continuity between the user interfaces. The method provides visual continuity between user interfaces, thus reducing the amount of user interaction with the device. Reducing the amount of user interaction with the device reduces wear-and-tear of the device and, for battery powered devices, increases battery life of the device. The method also reduces the cognitive burden on a user when interacting with user interfaces, thereby creating a more efficient human-machine interface.

As represented by block 702, the method 700 includes obtaining a first image. In some implementations, the first image corresponds to an input or reference image for the method 700. For example, the first image corresponds to a wallpaper for a wake screen user interface. For example, with reference to FIG. 2, the data processing system 200, which is included in or integrated with the electronic device 800, obtains image data 202A including the first image. For example, the data processing system 200 receives the image data 202A from a local or remote source. In another example, the data processing system 200 retrieves the image data 202A from a local or remote source. In yet another example, the data processing system 200 captures the image data 202A with an exterior- or interior-facing image sensor. As one example, the image data 202A includes an image that is set as the wallpaper for a wake screen user interface of the electronic device 800.

In some implementations, the method 700 is triggered in response to detecting a user input that corresponds to setting the first image as the wallpaper for the wake screen user interface. As such, the second image is generated based on the first image and set as the wallpaper for the home screen user interface. See U.S. Application No. 62/855,729, filed May 31, 2019, which is incorporated by reference herein in its entirety, for further description regarding setting wallpapers of the wake and home screen UIs. In some implementations, the method 700 is triggered in response to detecting a user input that corresponds to setting the first image as the wallpaper for the home screen user interface.

In some implementations, the method 700 is triggered in response to detecting a user input that corresponds to selecting a "smart gradient" or "color gradient" home screen treatment option within a wallpaper settings user interface. As such, the second image is generated based on the first image and set as the wallpaper for the home screen user interface within a preview pairing that shows the first image as the wallpaper for the wake screen user interface and the second image as the wallpaper for the home screen user interface. See U.S. Application No. 62/855,729, filed May 31, 2019, which is incorporated by reference herein in its entirety, for further description regarding the wallpaper settings user interface and home screen treatment options.

As represented by block 704, the method 700 includes determining one or more characterization properties for each of a plurality of pixels within the first image. In some implementations, a portion of the one or more characterization properties correspond color parameters including a hue value, a saturation value, a brightness/lightness value, and/or the like. As such, in some implementations, the one or more characterization properties include a hue value, a saturation value, and a brightness value for a respective pixel. In some implementations, a portion of the one or more characterization properties correspond to derived or relative parameters such as object labels, feature labels, foreground/background labels, and/or the like.

In some implementations, the device generates a pixel characterization vector for at least some of the pixels in the first image that at least include the one or more characterization properties. For example, the pixel characterization vector for a respective pixel within the first image includes color parameters (e.g., hue value, chroma/saturation value, brightness/lightness value, and/or the like), depth parameters (e.g., a foreground/background label), and other parameters (e.g., image plane coordinates, feature/object and/or the like).

For example, with reference to FIG. 2, the data processing system 200 or one or more components thereof (e.g., the task engine 242, the foreground/background discriminator 244, and the color analyzer 246) analyze the first image to generate one or more characterization properties (e.g., color parameters, depth parameters, and/or other parameters) for each of at least some of the pixels within the first image. Continuing with this example, the data processing system 200 or a component thereof (e.g., the pixel characterization engine 250) generates a pixel characterization vector for at least some of the pixels within the first image that includes the one or more characterization properties (e.g., color parameters, depth parameters, and/or other parameters). As shown in FIG. 3, a pixel characterization vector 310 for a respective pixel includes: a hue value 312 for the respective pixel, a chroma value 314 for the respective pixel, a brightness value 316 for the respective pixel, coordinates 318 for the respective pixel (e.g., 2D image plane for the respective pixel and optionally 3D absolute coordinates for an object associated with the respective pixel), a foreground or background label 320 for the respective pixel, one or more feature/object labels 322 for the respective pixel, and one or more other labels 324 for the respective pixel.

As represented by block 706, the method 700 includes determining a dominant hue based on the one or more characterization properties for each of the plurality of pixels within the first image. In some implementations, the dominant hue corresponds to a hue value associated with the greatness number of pixels within the first image. In some implementations, the dominant hue corresponds to a median, mean, or centroid hue value within a predefined hue range or radius associated with the greatness number of pixels within the first image.

In some implementations, the device plots the pixels within the first image against a color space (e.g., 2D or 3D) based on their color parameters and performs a clustering algorithm thereon such as k-means. For example, the color space is selected to correspond to human perception (e.g., the Munsell Color System, IPT, CIECAM02, CIELAB, iCAM06, etc.). For example, with reference to FIGS. 2 and 4A, the data processing system 200 or a component thereof (e.g., the clustering engine 262) plots the pixels associated with the first image against a 2D color space 402 based on the hue and chroma values thereof. For example, with reference to FIGS. 2 and 4B, the data processing system 200 or a component thereof (e.g., the clustering engine 262) divides the pixels associated with the first image into k clusters based on a k-means clustering algorithm. Here, assuming k=3, the clustering engine 262 divides the pixels into 3 clusters, including clusters 410, 420, and 430.

In some implementations, when using a k-means algorithm, k is set to a predetermined or deterministic value in order to generate fine grained clusters with low dispersion. For example, k≥3. In some implementations, the dominant hue corresponds to a cluster associated with the greatness number of pixels within the first image. In some implementations, the dominant hue corresponds to a median, mean, or centroid hue value within a cluster associated with the greatness number of pixels within the first image. For example, with reference to FIGS. 2 and 4F, the data processing system 200 or a component thereof determines the dominant hue by determining a median, hue, or centroid of the cluster 410 (e.g., the cluster with the most candidate pixels). As another example, with reference to FIGS. 2 and 4F, the data processing system 200 or a component thereof determines the dominant hue by identifying a pixel with the highest pixel instance count within the cluster 410 (e.g., the cluster with the most candidate pixels).

In some implementations, if two equally dominant hues exist within the first image, the device randomly or pseudo-randomly selects one of the two equally dominant hues. In some implementations, the device determines whether the first image is a black and white image before proceeding with the method. If the first image is a black and white image, the device may change the clustering algorithm, plot the pixels against a different color space, and/or perform different filtering operations (e.g., merely analyzing brightness values for pixels in the black and white image to generate a dark-to-light or light-to-dark gradient). As one example, if the first image is a black and white image, the device forgoes removing undersaturated and oversaturated as shown in FIG. 4C.

In some implementations, determining the dominant hue within the first image includes discarding one or more pixels within the first image that are associated with brightness values outside of a range of brightness values. As such, in some implementations, the device discards outlier pixels that are too bright or too dark. For example, with reference to FIG. 2, the data processing system 200 or a component thereof (e.g., the filter subsystem 254 or 264) discards pixels within the first image that are associated with brightness values outside of a brightness range. In some implementations, the brightness range corresponds to a predefined range of brightness values. In some implementations, the brightness range corresponds to a deterministic range of brightness values based on the hue, chroma, and/or brightness values associated with the pixels within the first image.

In some implementations, determining the dominant hue within the first image includes discarding one or more pixels within the first image that are associated with saturation values outside of a range of saturation values. As such, in some implementations, the device discards outlier pixels within the first image that are oversaturated or undersaturated. For example, with reference to FIGS. 2 and 4C, the data processing system 200 or a component thereof (e.g., the filter subsystem 264) discards undersaturated pixels within a first chroma exclusion region 442 and also discards oversaturated pixels within a second chroma exclusion region 444. In some implementations, the first chroma exclusion region 442 and the second chroma exclusion region 444 are associated with predefined ranges of chroma values. In some implementations, the first chroma exclusion region 442 and the second chroma exclusion region 444 are associated with deterministic ranges of chroma values based on the hue, chroma, and/or brightness values associated with the pixels within the first image.

In some implementations, determining the dominant hue within the first image includes discarding one or more pixels within the first image that are associated with a foreground of the first image based on depth information associated with the first image. In some implementations, the second image is based on pixels associated with the background of the first image and the hues therein. Alternatively, in some implementations, the device discards one or more pixels within the first image that are associated with a background of the first image. For example, with reference to FIG. 2, the data processing system 200 or a component thereof (e.g., the filter subsystem 254 or 264) discards pixels within the first image that are associated with a foreground label. As another example, with reference to FIG. 2, the data processing system 200 or a component thereof (e.g., the filter subsystem 254 or 264) discards pixels within the first image that are associated with a background label.

As represented by block 708, the method 700 includes determining a plurality of hues that satisfy a predetermined perception threshold relative to the dominant hue based on the one or more characterization properties for each of the plurality of pixels within the first image, wherein the plurality of hues is different from the dominant hue. In some implementations, the plurality of hues includes one or more hues similar to but different from the dominant hue. In some implementations, the plurality of hues is associated with pixels within the image that are associated with hue values within a predefined hue angle from the dominant hue. In some implementations, the hue angle is a predefined number of degrees on either side of the dominant hue (e.g., +/−10°).

In some implementations, the hue angle is biased in one direction based on the dominant hue. In some implementations, the plurality of hues is associated with pixels within the image that are associated with hue values within the cluster associated with the dominant hue. In some implementations, the plurality of hues is associated with pixels within the image that are associated with hue values within a dispersion threshold associated with Y standard deviations relative to the dominant hue. For example, with reference to FIGS. 2 and 4F, after determining that the dominant hue corresponds to a pixel within the cluster 410, the data processing system 200 or a component thereof determines the plurality of hues by identifying the other pixels within the cluster 410.

In some implementations, the predetermined perception threshold corresponds to a hue angle. As one example, the hue angle restricts the plurality of hues to natural lighting environment and/or human visual perception. For example, with reference to FIGS. 2 and 4E, the data processing system 200 or a component thereof (e.g., the filter subsystem 264) discards pixels within the cluster 410 that are outside of the first hue inclusion region 462 that corresponds to X° (e.g., 10) on either side of the centroid 452. As another example, the hue angle is replaced with a dispersion threshold associated with Y standard deviations relative to the dominant hue.

As represented by block 710, the method 700 includes generating a second image based at least in part on the dominant hue and the plurality of hues. In some implementations, the second image corresponds to a color gradient generated based on the dominant hue and the plurality of hues within the first image. In some implementations, the second image corresponds to a grid/checkerboard pattern or another template pattern that is filled in using the dominant hue and the plurality of hues within the first image. In some implementations, the second image includes a template character whose clothes are colorized using the dominant hue and the plurality of hues within the first image. In some implementations, the second image corresponds to a template image (e.g., a group of balloons) that are colorized using the dominant hue and the plurality of hues within the first image.

In some implementations, the method 700 includes setting the second image as a wallpaper for a user interface such as the home screen user interface or the wake screen user interface. In some implementations, the method 700 includes setting the background for a movie summary field or the like based on the dominant hue and the plurality of hues within the first image associated with a movie poster. In some implementations, the method 700 includes setting the background for an album summary field, field of scrolling lyrics, associated buttons, or the like based on the dominant hue and the plurality of hues within the first image associated with album cover art.

In some implementations, when the dominant hue is the only hue within the first image, the second image may be a solid color that corresponds to the dominant hue. In some implementations, when the dominant hue is the only hue within the first image, the second image may be a combination of the dominant hue and one or more other hues different from the dominant hue that are randomly selected within a predefined hue angle of the dominant hue.

In some implementations, the second image includes a plurality of portions with at least one portion for the dominant hue and least one portion for each of the plurality of hues. In some implementations, the size of the portions corresponds to the number of pixels within the first image associated with a respective hue. In some implementations, two or more resultant images (e.g., smart gradient or color gradient options) are generated based on the first image. As such, for example, two dominant hues are identified by setting k=4 and taking M clusters with the highest number of samples (where M≤k). In this example, the device generates a first color gradient (e.g., a first resultant image) based on the first dominant hue and the plurality of hues associated with pixels close thereto and a second color gradient (e.g., a second resultant image) based on the second dominant hue and the plurality of hues associated with pixels close thereto.

For example, with reference to FIG. 2, the data processing system 200 or a component thereof (e.g., the image generator 266) generates the one or more resultant images 275 based on the candidate pixels, which are displayed with a solid black fill in FIG. 4F. As another example, the image generator 266 generates a resultant image based on a portion of the candidate pixels that are within the cluster with the most candidate pixels such as the cluster 410 in FIG. 4F. As yet another example, the image generator 266 generates M resultant images based on a portion of the candidate pixels that are within the M clusters with the most candidate pixels in FIG. 4F. In this example, assuming M=2, the image generator 266 generates a first resultant image using the candidate pixels within the cluster 410 and a second resultant image using the candidate pixels within the cluster 420. In this example, M≤k associated with the k-means clustering algorithm.

In some implementations, the second image includes one or more portions associated with different hues within the first image including a first portion of the second image is associated with the dominant hue and a second portion of the second image is associated with a respective hue among the plurality of hues. For example, each of the one or more portions corresponds to a horizontal or vertical band. In some implementations, the shape or dimensions of the portions are based on objects, features, and/or the like recognized within the first image. For example, if the first image includes many circular or curved features, the portions may correspond to curves or ellipsoids.

For example, FIG. 5 shows a representation of a first resultant image 500 associated with a set of candidate pixels (e.g., the remaining pixels within the cluster 410 in FIG. 4F). For example, the first resultant image 500 includes a plurality of portions 502A-502K (sometimes referred to herein as the portions 502). According to some implementations, each of the portions 502 is associated with a respective pixel within the set of candidate pixels. In some implementations, the portions 502 correspond to horizontal regions, vertical regions, diagonal regions, or the like. In some implementations, the image generator 266 generates each of the portions 502 based on hue and chroma values for a respective pixel within the set of candidate pixels. As such, for example, a portion 502B is generated based on hue and chroma values for a respective pixel within the set of candidate pixels. In some implementations, the image generator 266 performs a fading, smoothing, blending, interpolating, and/or the like operation between each of the portions 502. As such, the first resultant image 500 may resemble a color gradient.

In some implementations, a first size of a first portion of the second image associated with the dominant hue is based at least in part on a first number of pixels within the first image associated with the dominant hue, and wherein a second size of a second portion of the second image associated with a respective hue among the plurality of hues is based at least in part on a second number of pixels within the first image associated with the respective hue. For example, the first and second sizes correspond to one or more dimensional values such as a length and/or width value. As shown in FIG. 5, the first resultant image 500 includes four (4) portions 502D because the set of candidate pixels includes four (4) pixels with the same hue and chroma values. Similarly, the first resultant image 500 includes two (2) portions 502A because the set of candidate pixels includes two (2) pixels with the same hue and chroma values.

In some implementations, the first size of the first portion of the second image and the second size of the second portion of the second image are limited by a predefined dimensional criterion. As one example, the first and second portions are limited to A % of the second image. As such, even if a multitude of pixels in the first image has same hue and chroma values, the portion size associated with those pixels is limited to A % of the second image. As another example, the first and second portions are limited to a predefined length or width.

In some implementations, a predefined transition operation is performed between the one or more portions. In some implementations, the predefined transition operation corresponds to a smoothing, blending, or interpolating operation. For example, the device avoids stripes, lines, blocks, etc. within the second image and instead creates a color gradient for the second image.

In some implementations, the one or more portions are arranged according to one or more arrangement criteria. In some implementations, the one or more arrangement criteria correspond to brightness. As such, for example, the device sorts the portions from brightest-to-darkest (or darkest-to-brightest) based on perceived luminosity or vice versa. In some implementations, the one or more arrangement criteria correspond to pixel instance count. As such, for example, the device sorts the portions in ascending or descending order based on number of associated pixels in the first image.

As shown in FIG. 5, the portions 502 within the first resultant image 500 are arranged based on the brightness values of the associated pixels from most bright on the bottom to least bright on the top. As such, with reference to the first resultant image 500, a first portion 502B of the first resultant image 500 is generated based on the hue and chroma values of a corresponding first candidate pixel that is associated with a highest brightness value. Furthermore, with reference to the first resultant image 500, an N-th portion 502F of the first resultant image 500 is generated based on the hue and chroma values of a corresponding N-th candidate pixel that is associated with a lowest brightness value.

As shown in FIG. 5, the portions 502 within the second resultant image 550 are arranged based on pixel instance count from least on the bottom to most on the top. As such, with reference to the second resultant image 550, a portion 502K of the second resultant image 550 is generated based on the hue and chroma values of a corresponding candidate pixel with a count of one (1) pixel instance within the set of candidate pixels. Furthermore, with reference to the second resultant image 550, four (4) portions 502D of the second resultant image 550 are generated based on the hue and chroma values of a corresponding candidate pixel that is associated with a count of four (4) pixel instances within the set of candidate pixel.

In some implementations, the method 700 includes: after generating the second image, detecting an input that corresponds to modifying the first image to generate a modified first image; and, in response to detecting the input, updating the second image based on one or more visual properties for each of a plurality of pixels in the modified first image. For example, the input corresponds to a cropping input relative to the first image, the application of an image filter to the first image, a markup or annotation input relative to the first image, or the like. As such, the device updates the second image based on modification or changes to the first image.

It should be understood that the particular order in which the operations in FIG. 7 have been described is merely example and is not intended to indicate that the described order is the only order in which the operations could be performed. One of ordinary skill in the art would recognize various ways to reorder the operations described herein.

Figure 8:
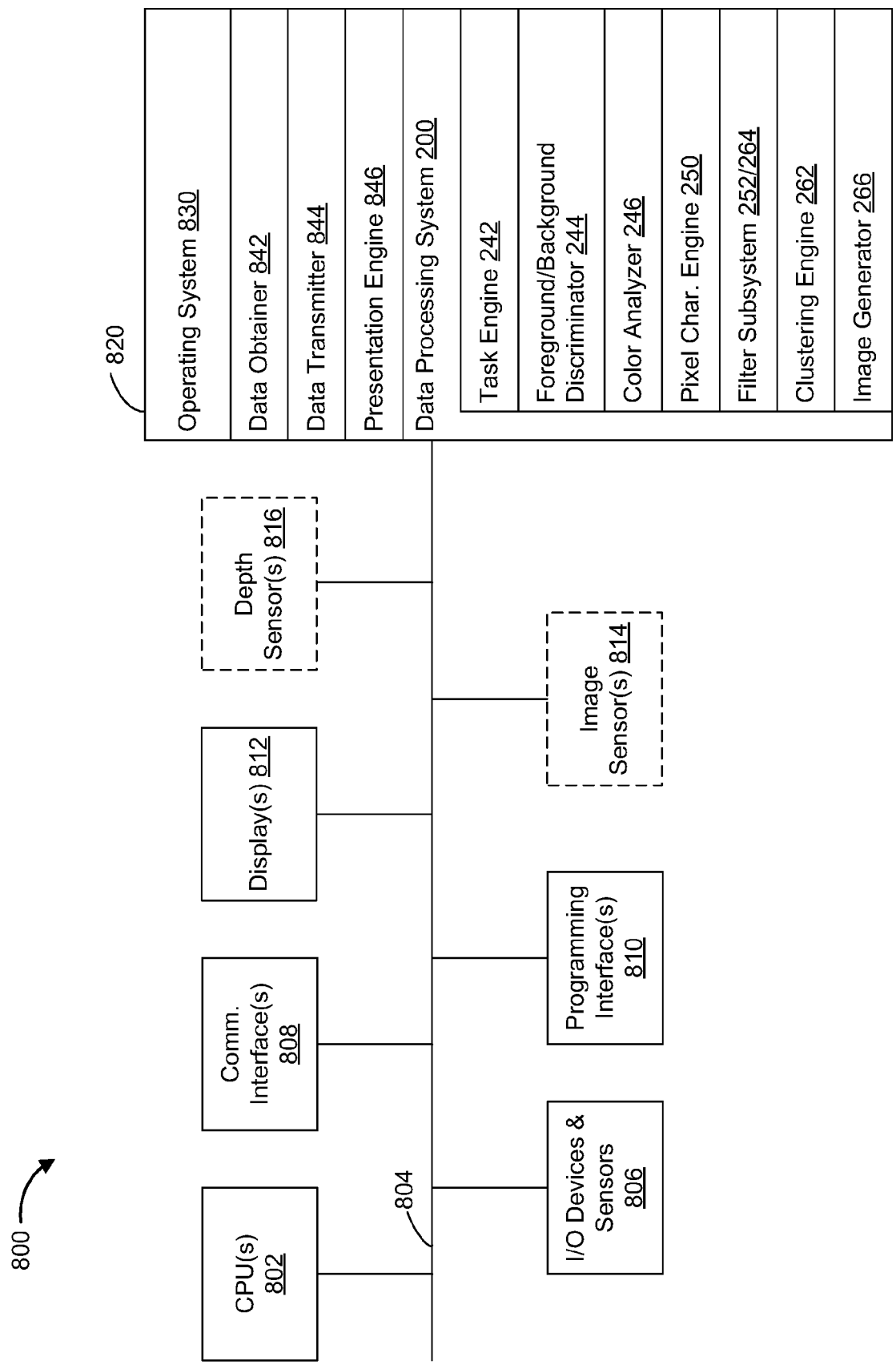
FIG. 8 is a block diagram of an example electronic device in accordance with some implementations.

FIG. 8 is a block diagram of an example of the electronic device 800 (e.g., a wearable computing device, mobile phone, tablet, laptop, desktop computer, kiosk, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 800 includes one or more processing units 802 (e.g., microprocessors, application-specific integrated circuits (ASICs), field-programmable gate arrays (FPGAs), graphics processing units (GPUs), central processing units (CPUs), processing cores, and/or the like), one or more input/output (I/O) devices and sensors 806, one or more communication interfaces 808 (e.g., universal serial bus (USB), Institute of Electrical and Electronics Engineers (IEEE) 802.3x, IEEE 802.11x, IEEE 802.16x, global system for mobile communications (GSM), code-division multiple access (CDMA), time-division multiple access (TDMA), global positioning system (GPS), infrared (IR), BLUETOOTH, ZIGBEE, and/or the like type interface), one or more programming (e.g., I/O) interfaces 810, one or more displays 812, one or more optional interior- and/or exterior-facing image sensors 814, one or more optional depth sensors 816, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 812 are configured to present user interfaces or other content to a user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 812 correspond to diffractive, reflective, polarized, holographic, etc. waveguide displays.

In some implementations, the one or more optional interior- and/or exterior-facing image sensors 814 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the one or more optional depth sensors 816 correspond to sensors that measure depth based on structured light, time-of-flight, or the like.

The memory 820 includes high-speed random-access memory, such as dynamic random-access memory (DRAM), static random-access memory (SRAM), double-data-rate random-access memory (DDR RAM), or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830, a data obtainer 842, a data transmitter 844, a presentation engine 846, and a data processing system 200.

The operating system 830 includes procedures for handling various basic system services and for performing hardware dependent tasks.

In some implementations, the data obtainer 842 is configured to obtain data (e.g., presentation data, user interaction data, sensor data, location data, etc.) from at least one of the I/O devices and sensors 806 of the electronic device 800 and another local and/or remote source. To that end, in various implementations, the data obtainer 842 includes instructions and/or logic therefor, and heuristics and metadata therefor.

In some implementations, the data transmitter 844 is configured to transmit data (e.g., presentation data, location data, user interaction data, etc.) to another device. To that end, in various implementations, the data transmitter 844 includes instructions and/or logic therefor, and heuristics and metadata therefor.

In some implementations, the presentation engine 846 is configured to present user interfaces and other content to a user via the one or more displays 812. To that end, in various implementations, the presentation engine 846 includes instructions and/or logic therefor, and heuristics and metadata therefor.

In some implementations, the data processing system 200 is configured to generate one or more resultant images based on image data 202A, depth data 202B, and/or other sensor data 202C as discussed above with reference to FIG. 2. To that end, in various implementations, the data processing system 200 includes a task engine 242, a foreground/background discriminator 244, a color analyzer 246, a pixel characterization engine 250, a filter subsystem 252/264, a clustering engine 262, and an image generator 266. The aforementioned components of the data processing system 200 are described above with reference to FIG. 2 and will not be described again for the sake of brevity, Although the data obtainer 842, the data transmitter 844, the presentation engine 846, and the data processing system 200 are shown as residing on a single device (e.g., the electronic device 800), it should be understood that in other implementations, any combination of data obtainer 842, the data transmitter 844, the presentation engine 846, and the data processing system 200 may be located in separate computing devices.

Moreover, FIG. 8 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including non-transitory memory and one or more processors coupled with the non-transitory memory:
obtaining a first image;
determining one or more characterization properties for each of a plurality of pixels within the first image;
determining a dominant hue of the first image based on the one or more characterization properties for each of the plurality of pixels within the first image;
determining a plurality of hues that satisfy a predetermined perception threshold relative to the dominant hue of the first image based on the one or more characterization properties for each of the plurality of pixels within the first image, wherein the plurality of hues is different from the dominant hue, and wherein determining the plurality of hues includes comparing the dominant hue of the first image against each of the one or more characterization properties for each of a plurality of pixels within the first image; and
generating a second image based at least in part on the dominant hue and the plurality of hues.

2. The method of claim 1, wherein the second image includes one or more portions associated with different hues within the first image, wherein a first portion of the second image is associated with the dominant hue and a second portion of the second image is associated with a respective hue among the plurality of hues.

3. The method of claim 2, wherein a predefined transition operation is performed between the one or more portions.

4. The method of claim 2, wherein the one or more portions are arranged according to one or more arrangement criteria.

5. The method of claim 1, wherein a first size of a first portion of the second image associated with the dominant hue is based at least in part on a first number of pixels within the first image associated with the dominant hue, and wherein a second size of a second portion of the second image associated with a respective hue among the plurality of hues is based at least in part on a second number of pixels within the first image associated with the respective hue.

6. The method of claim 5, wherein the first size of the first portion of the second image and the second size of the second portion of the second image are limited by a predefined dimensional criterion.

7. The method of claim 1, wherein the predetermined perception threshold corresponds to a hue angle.

8. The method of claim 1, wherein determining the dominant hue within the first image includes at least one of:
discarding one or more pixels within the first image that are associated with brightness values outside of a range of brightness values;
discarding one or more pixels within the first image that are associated with saturation values outside of a range of saturation values; or
discarding one or more pixels within the first image that are associated with a foreground of the first image based on depth information associated with the first image.

9. The method of claim 1, further comprising:
after generating the second image, detecting an input that corresponds to modifying the first image to generate a modified first image; and
in response to detecting the input, updating the second image based on one or more visual properties for each of a plurality of pixels in the modified first image.

10. The method of claim 1, wherein the one or more characterization properties corresponds to a hue value, a saturation value, and a brightness value.

11. A device comprising:
one or more processors;
a non-transitory memory; and
one or more programs stored in the non-transitory memory, which, when executed by the one or more processors, cause the device to:
obtain a first image;
determine one or more characterization properties for each of a plurality of pixels within the first image;
determine a dominant hue of the first image based on the one or more characterization properties for each of the plurality of pixels within the first image;
determine a plurality of hues that satisfy a predetermined perception threshold relative to the dominant hue of the first image based on the one or more characterization properties for each of the plurality of pixels within the first image, wherein the plurality of hues is different from the dominant hue, and wherein determining the plurality of hues includes comparing the dominant hue of the first image against each of the one or more characterization properties for each of a plurality of pixels within the first image; and
generate a second image based at least in part on the dominant hue and the plurality of hues.

12. The device of claim 11, wherein the second image includes one or more portions associated with different hues within the first image, wherein a first portion of the second image is associated with the dominant hue and a second portion of the second image is associated with a respective hue among the plurality of hues.

13. The device of claim 11, wherein a first size of a first portion of the second image associated with the dominant hue is based at least in part on a first number of pixels within the first image associated with the dominant hue, and wherein a second size of a second portion of the second image associated with a respective hue among the plurality of hues is based at least in part on a second number of pixels within the first image associated with the respective hue.

14. The device of claim 11, wherein determining the dominant hue within the first image includes at least one of:
discarding one or more pixels within the first image that are associated with brightness values outside of a range of brightness values;
discarding one or more pixels within the first image that are associated with saturation values outside of a range of saturation values; or
discarding one or more pixels within the first image that are associated with a foreground of the first image based on depth information associated with the first image.

15. The device of claim 11, wherein the one or more programs further cause the device to:

after generating the second image, detect an input that corresponds to modifying the first image to generate a modified first image; and in response to detecting the input, update the second image based on one or more visual properties for each of a plurality of pixels in the modified first image.

16. The device of claim 11, wherein the one or more characterization properties corresponds to a hue value, a saturation value, and a brightness value.

17. The device of claim 11, wherein a predefined transition operation is performed between the one or more portions.

18. The device of claim 11, wherein the one or more portions are arranged according to one or more arrangement criteria.

19. A non-transitory memory storing one or more programs, which, when executed by one or more processors of a device, cause the device to:

obtain a first image;

determine one or more characterization properties for each of a plurality of pixels within the first image;

determine a dominant hue of the first image based on the one or more characterization properties for each of the plurality of pixels within the first image;

determine a plurality of hues that satisfy a predetermined perception threshold relative to the dominant hue of the first image based on the one or more characterization properties for each of the plurality of pixels within the first image, wherein the plurality of hues is different from the dominant hue, and wherein determining the plurality of hues includes comparing the dominant hue of the first image against each of the one or more characterization properties for each of a plurality of pixels within the first image; and generate a second image based at least in part on the dominant hue and the plurality of hues.

20. The non-transitory memory of claim 19, wherein the second image includes one or more portions associated with different hues within the first image, wherein a first portion of the second image is associated with the dominant hue and a second portion of the second image is associated with a respective hue among the plurality of hues.

21. The non-transitory memory of claim 19, wherein a first size of a first portion of the second image associated with the dominant hue is based at least in part on a first number of pixels within the first image associated with the dominant hue, and wherein a second size of a second portion of the second image associated with a respective hue among the plurality of hues is based at least in part on a second number of pixels within the first image associated with the respective hue.

22. The non-transitory memory of claim 19, wherein determining the dominant hue within the first image includes at least one of:

discarding one or more pixels within the first image that are associated with brightness values outside of a range of brightness values;

discarding one or more pixels within the first image that are associated with saturation values outside of a range of saturation values; or discarding one or more pixels within the first image that are associated with a foreground of the first image based on depth information associated with the first image.

23. The non-transitory memory of claim 19, wherein the one or more programs further cause the device to:

after generating the second image, detect an input that corresponds to modifying the first image to generate a modified first image; and in response to detecting the input, update the second image based on one or more visual properties for each of a plurality of pixels in the modified first image.

24. The non-transitory memory of claim 19, wherein the one or more characterization properties corresponds to a hue value, a saturation value, and a brightness value.

25. The non-transitory memory of claim 19, wherein the predetermined perception threshold corresponds to a hue angle.

* * * * *